Sept. 4, 1951  S. J. CATRAVAS  2,567,053
ARTIFICIAL HORIZON HAVING GYROSCOPE CONTROL MEANS
Filed July 30, 1949

Inventor
S. J. Catravas

Patented Sept. 4, 1951

2,567,053

UNITED STATES PATENT OFFICE 2,567,053

ARTIFICIAL HORIZON HAVING GYROSCOPE CONTROL MEANS

Spiro John Catravas, Cottesloe, Johannesburg, Transvaal, Union of South Africa

Application July 30, 1949, Serial No. 107,693
In Great Britain August 3, 1948

10 Claims. (Cl. 88—1)

1

This invention relates to artificial horizons. In existing artificial horizons for use with various instruments, an indicator arrangement fixed on to one of the two frames of a unidirectional gyroscope indicates the horizontal direction. The indicator is compelled to maintain its horizontal direction by means of a pendulum arrangement which causes the gyroscope to precess, either by mechanical or other known means. This has the disadvantage that when the artificial horizon is incorporated in an aircraft or marine instrument the lateral components of various accelerating forces cause the oscillations of the pendulum to over or under precess the gyroscope with the result that an accurate horizontal direction cannot possibly be maintained. Such artificial horizon arrangements are therefore unsuitable for use with precision instruments such as sextants and the present invention aims at overcoming this disadvantage.

In accordance with the invention, therefore, an artificial horizon is provided with optical means for the linkage of the pendulum and gyroscope movements and for registering such movements relative to each other. In this manner the precessional effects of the gyroscope, due to the use of mechanical or other known linkage between the gyroscope and the pendulum, are entirely eliminated.

Improved artificial horizons provided with the said optical linkage and suitably designed for each particular case, may be applied to various types of instruments.

In order to illustrate the nature of the invention, and the principles underlying it, one form of artificial horizon in accordance with the present invention is further described by way of example, which horizon may advantageously be used with sextants, but it should be understood that the invention is not limited by the said example.

In this artificial horizon, the horizon line is the image, formed in the field of view of the viewing telescope or the like, of a glowing line or spot, etc. on a fluorescent (long after glow fluorescent) screen carried by a gyroscope.

The said image may be magnified or otherwise, and the fluorescent screen is preferably ring-shaped.

The casing of the said artificial horizon carries a source of light and a pendulum member provided with an optical slit or pinhole, parallel rays from said light source being caused to pass through said slit or pinhole to produce (excite) the glowing line or spot on the fluorescent screen.

2

The pendulum member and the ring-shaped fluorescent screen are both mounted on coaxially situated pivots.

Preferably the pendulum member is furnished with damping means serving to reduce oscillations thereof and is further provided with optical means for forming an image of the slit or pinhole, usually of reduced size, on the fluorescent screen causing excitation of the glowing line or spot.

Optical means are provided secured on to the casing of the artificial horizon to enable the projection of parallel or otherwise directed rays from the glowing part of the screen in a convenient direction.

Mechanical or other means are incorporated in the artificial horizon which allow rays emitted from the glowing part of the fluorescent screen to be directed as set forth in the preceding paragraph, but prevent rays from the source of light from being so directed.

An averaging artificial horizon for use with sextants will now be described by way of example, with reference to the accompanying diagrammatic drawings, in which.

Figure 1:
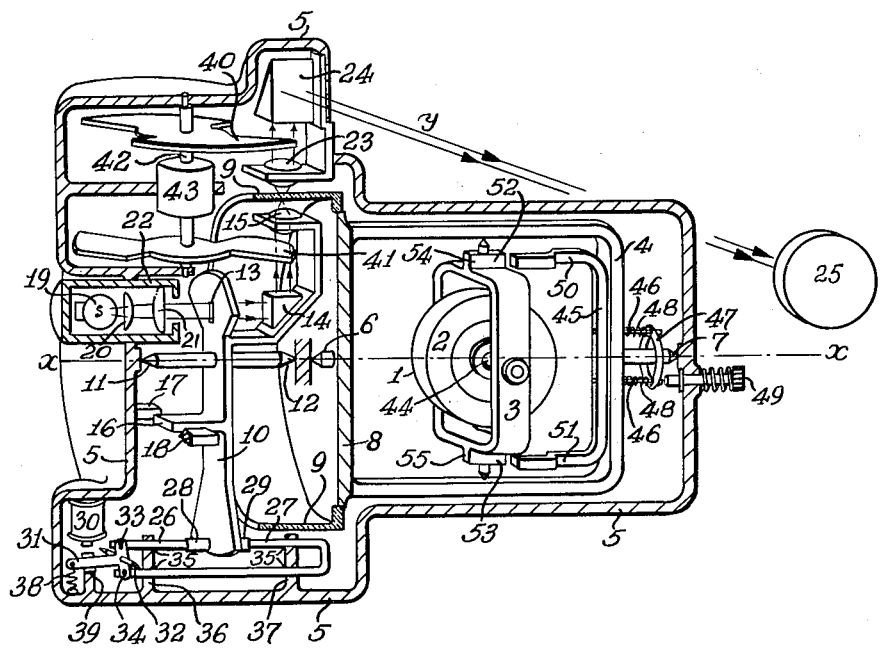
Figure 1 is an oblique parallel projection partly in section illustrating the principle of an artificial horizon embodying the present invention.

Referring to Fig. 1, an electrically or otherwise driven gyroscope 1 consisting of a rotor 2 and inner and outer frames 3 and 4 respectively, is mounted within the casing 5 on pivots 6 and 7. A disc 8 is secured to the outer frame 4 and said disc lies in a plane normal to the pivot axis $x$ of such outer frame. A ring-shaped piece of glass or the like 9 is secured to the circumference of the disc 8 and it extends in a direction normal to the plane of the disc. The glass is coated with long afterglow fluorescent material and it constitutes the fluorescent screen.

A pendulum 10 is pivotally mounted at 11 and 12 coaxially with the pivotal mounting of the outer frame 4. The fluorescent screen and the pendulum 10 may thus turn and oscillate respectively about the same axis $x$. The pendulum 10 is provided with an optical slit 13 and it carries a prism 14 and a lens 15.

The pendulum 10 is also provided with a projection 16 which extends into the space between stops 17 and 18 carried by the casing 5. In this manner, the angular movement of the pendulum 10 is restricted. A suitable angular movement is of the order of 30°.

19 is a source of artificial light carried by the casing 5 and the rays emitted therefrom are collimated by the lenses 20 and 21 before reaching the plane of the pendulum 10. The width of the parallel rays leaving the lamp housing 22, measured in the horizontal plane, is large enough to enable the slit 13 to be in their path for an angular movement of the pendulum of the order of 30°, which is the angle to which movement is restricted in the manner described in the preceding paragraph.

The rays which pass through the slit 13 are refracted towards the fluorescent screen by the prism 14 and are focused on the screen by the lens 15.

Rays emitted from the glowing part of the screen are collimated to infinity by the lens 23 which is of larger field than the lens 15; thereafter, the parallel rays are refracted by the prism 24 in the direction $y$ and eventually enter the object lens 25 of the sextant telescope when the sextant is held within the allowable margin of inclination from the horizontal. The lens 23 and the prism 24 are both secured to the casing 5.

The pendulum 10 is provided with special damping means to reduce the oscillations to a minimum and to eliminate the known time lag of damped oscillations. The damping means comprises rods 26 and 27 which carry short lengths of rubber tubing 28 and 29 (e. g. bicycle valve tubing) the extremities of which extend towards opposite sides of the pendulum. The areas of the pendulum surfaces against which the extremities of the rubber tubes 28 and 29 abut when in contact are plane and parallel both to each other and to a plane normal to the axis $x$.

The rods 26 and 27 are vibrated by a make-and-break bell-type of electromagnetic system or the like. Such mechanism consists of an electromagnet 30 which actuates a lever 31 pivotally mounted on an axis 32 which is at right angles to the axis $x$. The lever 31 is loosely coupled to the rods 26 and 27 at 33 and 34 respectively and the rods are guided in holes 35 in the inwardly extending flanges 36 and 37 provided on the casing 5. A spring 38 acts on the lever 31 in a sense opposite to that of the magnetic force exerted by the electromagnet 30 and forces it to make contact with the electrical contact point 39 whereupon the electromagnetic circuit closes. Since the electromagnetic force is sufficient to overcome the force of the spring 38, the closing of the circuit causes the lever 31 to be drawn towards the electromagnet 30 and contact with point 39 is broken. The circuit is now open and the spring reasserts itself and pulls the lever 31 away from the electromagnet 30. This cycle of operations repeats itself and the extremities of the rubber tubes 28 and 29 are thus brought alternately into contact with and out of contact with the opposite surfaces of the pendulum 10 in rapid sequence.

The vibration of the rods 26 and 27 is in a direction parallel to that of the axis $x$. The pendulum 10 is free to move and tends to assume a direction parallel to the resultant gravitational force at the instant when the extremities of the rubber tubes 28 and 29 are drawn away from the pendulum. When, however, it overshoots the said direction and starts to oscillate, the eventual touch of the rubber tubes 28 and 29 creates a frictional force opposing such motion. The oscillations are thus damped during the instants of short duration in which the tubes 28 and 29 are in contact with the pendulum.

Means are incorporated which allow only the rays emitted from the glowing part of the fluorescent screen to reach the telescope. Such means comprises shutters 40 and 41 each of which is made from a disc from which two diametrically opposite quadrants have been removed. The shutters are mounted on a common spindle 42 which is revolved by a small electric motor 43. The shutters are mounted on the spindle 42 with the segments at right angles to each other and shutter 40 revolves between the lens 23 and the prism 24, whilst shutter 41 revolves between lens 15 and prism 14. When the shutter 41 prevents the rays from reaching the fluorescent screen the rays emitted from the screen are allowed to reach the telescope and rays from the source 19 are allowed to excite the screen only when the rays emitted from the screen are prevented from reaching the telescope.

Means are incorporated to keep the spindle 44 of the rotor 2 in a plane normal to the axis $x$ when the artificial horizon is switched off and to release it from this position when the rotor has been started. This is to ensure the best vertical directive control of the screen by the gyroscope during the period of observation, the screen then turning with the same angular velocity as the apparent rate of change of altitude relative to the observer. Such means comprises a U-shaped member 45 situated within the outer frame 4 of the gyroscope and capable of movement in the direction of the axis $x$. Studs 46 which are secured to the member 45 pass freely through holes in the outer frame 4 and carry an annulus 47 which is concentric with the pivot 7. Each stud carries a compression spring 48 between the outer frame 4 and the annulus 47 and these springs urge the member 45 against the outer frame 4 and away from the pivot axis of the inner frame 3. A spring-loaded stud 49 is mounted on the casing and when it is pressed inwards, its extremity contacts the annulus 47 and forces the member 45 towards the pivot axis of the inner frame 3. When the spindle 44 of the rotor 2 is in a plane normal to the axis $x$ and the stud 49 is pressed inwards, the extremities of the arms 50 and 51 of the U-shaped member 45 slide over the faces 52 and 53 on the projections 54 and 55 formed on the inner frame 3. When, however, the spindle 44 is in a plane which is not normal to the axis $x$ and the stud 49 is pressed inwards, the extremities of the arms 50 and 51 contact the faces 52 and 53 respectively and cause the inner frame 3 to turn about its pivots until the spindle 44 is again in a plane normal to the axis $x$.

Since the azimuth of the star $y'$ under observation, the true speed of the craft and the track which it will be making good during the time of observation, as well as the actual time taken to make the observation are generally variable quantities, it will be understood that the relative movement between the pendulum and gyroscope will not normally be constant for any two observations. So, referring to Fig. 3, the image formed in the field of view $z$ will look like a luminous rectangle $v$ the length of which is fixed but the height of which is variable for each observation.

The average altitude of the star $y'$ for the mean time of observation will be obtained when, with the aid of the sextant index arm, coincidence of the star $y'$ with the mid-height of the rectangle $v$ is brought about.

After a pre-selected time interval of observation, the source of light 19 may be switched off automatically (e. g. by means of a clockwork mechanism) and thereafter the rectangular image $v$ will be moving at the same rate as the star $y'$, thus enabling the observer to obtain coincidence easily and accurately. If desired, means may be provided to indicate to the observer any displacement of the plane of the sextant from the vertical during observation.

Figures 2, 3:
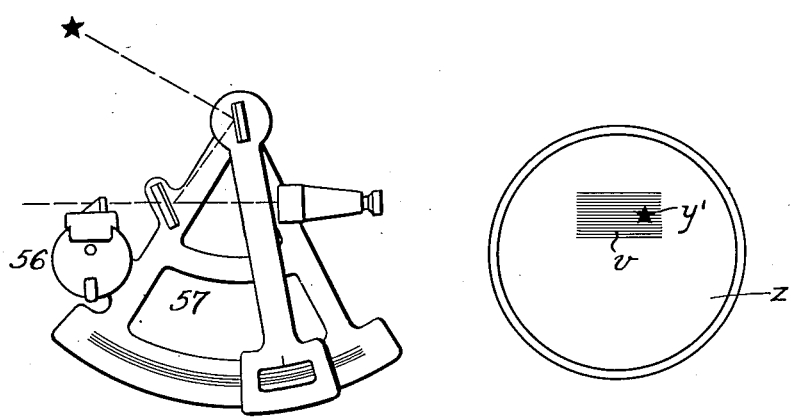
Figure 2 is a reduced side elevation illustrating a marine sextant fitted with the present invention.
Figure 3 is an enlarged representation of the telescope field of view of the sextant shown in Fig. 2.

In Fig. 2, the artificial horizon, generally indicated at 56 in reduced outline, is shown fitted to a sextant 57. The axis $x$ is perpendicular to the plane of the sextant.

I claim:

1. An artificial horizon comprising within a casing, a gyroscope having a rotor and inner and outer pivotally mounted frames; a fluorescent screen carried by the outer frame; a pendulum pivotally mounted co-axially with the outer frame; an optical aperture in said pendulum; a source of light; optical means for directing rays from said source of light through said optical aperture and focussing them on said screen; optical means for directing the rays emitted from said screen into a viewing means; and shutter means for preventing the rays from the source of light reaching the screen at the instant when rays emitted from the screen are being directed into the viewing means and vice versa.

2. An artificial horizon, according to claim 1, in which the fluorescent screen is ring-shaped and in which the screen and the pendulum are mounted on co-axially situated pivots.

3. An artificial horizon, according to claim 1, in which the pendulum carries optical means for projecting and forming an image of the optical aperture on the screen to produce (i. e. excite) a glow.

4. An artificial horizon, according to claim 1, in which the rays emitted from the source of light are collimated before passing through the optical aperture.

5. An artificial horizon, according to claim 1, in which the pendulum is provided with damping means to reduce its oscillations.

6. An artificial horizon, according to claim 5, in which the damping means comprises a pair of rods the opposed extremities of which are provided with resilient means and extend towards opposed plane surfaces of the pendulum which are parallel to the plane of oscillation, and means for vibrating said rods so that their resilient extremities are brought alternately into and out of contact with said surfaces.

7. An artificial horizon, according to claim 1, in which the pendulum is provided with damping means to reduce its oscillations and in which the damping means comprises a pair of rod the opposed extremities of which are provided with resilient means and extend towards opposed plane surfaces of the pendulum which are parallel to the plane of oscillation, and make-and-break bell-type electromagnetic means for vibrating said rods so that their resilient extremities are brought alternately into and out of contact with said surfaces.

8. An artificial horizon, according to claim 1, in which the shutter means comprises two shutters mounted on a common spindle and rotatable therewith, said shutters being mounted at right angles to each other.

9. An artificial horizon, according to claim 1, in which means is provided for keeping the axis of rotation of the gyroscope in a plane normal to the axis of oscillation of the pendulum when the artificial horizon is switched off and releasing it from this position when the gyroscope has been started.

10. An artificial horizon, according to claim 9, in which said means comprises means carried by the inner frame and an element adapted to be projected towards the axis of rotation of the inner frame to co-operate with the means carried by the inner frame to produce the desired result.

SPIRO JOHN CATRAVAS.

REFERENCES CITED

The following references are of record in the file of this patent:

UNITED STATES PATENTS

| Number | Name | Date |
|---|---|---|
| 1,110,347 | Roberts | Sept. 15, 1914 |
| 1,921,630 | Mechau | Aug. 8, 1933 |
| 2,298,010 | Hadjilias | Oct. 6, 1942 |
| 2,432,613 | Fedde | Dec. 16, 1947 |

FOREIGN PATENTS

| Number | Country | Date |
|---|---|---|
| 360,390 | Germany | Oct. 2, 1922 |